United States Patent [19]
Ribner et al.

[11] Patent Number: 6,028,891
[45] Date of Patent: *Feb. 22, 2000

[54] ASYMMETRIC DIGITAL SUBSCRIBER LOOP TRANSCEIVER AND METHOD

[75] Inventors: David Byrd Ribner, Andover; David Hall Robertson, Boxford, both of Mass.

[73] Assignee: Analog Devices, Inc., Norwood, Mass.

[*] Notice: This patent issued on a continued prosecution application filed under 37 CFR 1.53(d), and is subject to the twenty year patent term provisions of 35 U.S.C. 154(a)(2).

[21] Appl. No.: 08/670,337

[22] Filed: Jun. 25, 1996

[51] Int. Cl.$^7$ .................................. H04B 1/38; H04L 5/16
[52] U.S. Cl. .............................................................. 375/222
[58] Field of Search .................................. 375/222, 219, 375/275, 346, 363

[56] References Cited

U.S. PATENT DOCUMENTS

| | | | |
|---|---|---|---|
| 4,882,726 | 11/1989 | Lang et al. ................................. | 370/24 |
| 4,972,436 | 11/1990 | Halim et al. ............................... | 375/28 |
| 5,034,962 | 7/1991 | Yamamoto et al. ........................ | 375/8 |
| 5,070,514 | 12/1991 | Tjahjadi ..................................... | 375/14 |
| 5,227,741 | 7/1993 | Marchetto et al. ....................... | 332/100 |
| 5,278,865 | 1/1994 | Amrany et al. ............................. | 375/8 |
| 5,394,437 | 2/1995 | Ayanoglu et al. ........................ | 375/222 |
| 5,410,343 | 4/1995 | Coddington et al. ....................... | 348/7 |
| 5,463,661 | 10/1995 | Moran, III et al. ...................... | 375/222 |
| 5,512,898 | 4/1996 | Norsworthy et al. .................... | 341/155 |
| 5,544,164 | 8/1996 | Baran ..................................... | 370/60.1 |
| 5,579,305 | 11/1996 | Norrell et al. .......................... | 370/32.1 |

OTHER PUBLICATIONS

Robertson, David, Recommendations for Specifying Transmission Mechanisms (D/A Converters) for ADSL Standard Jun. 6, 1994.

*Primary Examiner*—Stephen Chin
*Assistant Examiner*—Mohammad Ghayour
*Attorney, Agent, or Firm*—Fish & Richardson P.C.

[57] ABSTRACT

A discrete multi-tone, asymmetrical transceiver and method wherein a modem at a central office transmits information to a modem at a remote terminal on a down-stream signal and the modem at the remote terminal transmits information to the modem at the central office on an up-stream signal. The up-stream signal comprising data carried by a lower portion of a predetermined band of frequencies and the down-stream signal comprising data carried by an upper portion of the predetermined band of frequencies. The system includes an interpolator, at the remote terminal, for adding interpolated data into a stream of data distributed by the remote terminal modem among the lower portion of the predetermined band of frequencies for transmission in the up-stream signal. An ADC is provided at the modem of the central office, for converting the down-stream signal into digital samples at a sampling rate greater than the frequency of the highest frequency in the down-stream signal. A decimator is fed samples from the ADC at the ADC sampling rate and produces output samples at a lower sampling rate. A demodulator is fed the samples produced by the decimator at the lower sampling rate and converts such samples into the lower portion of the predetermined band of frequencies. The interpolator increases the rate of samples produced on the up-stream signal and thereby increases the frequency of images in such up-stream signal for more effective removal by the band pass filter of the remote terminal. Images in the up-stream signal which may couple into the receiver at the central office are increased in frequency and then are effective filtering by the decimator.

7 Claims, 7 Drawing Sheets

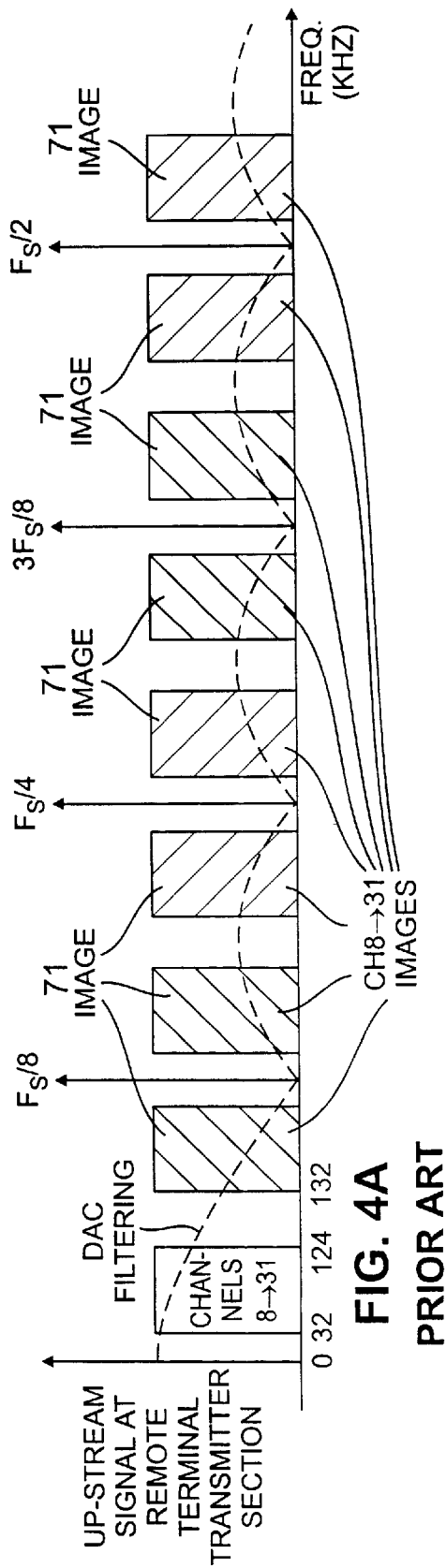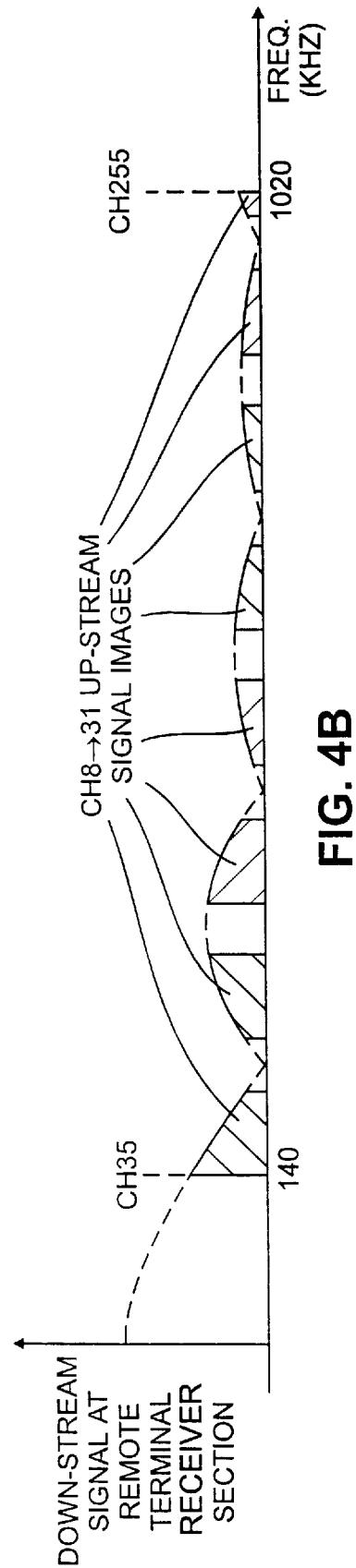

ASYMMETRIC DIGITAL SUBSCRIBER LOOP TRANSCEIVER AND METHOD

BACKGROUND OF THE INVENTION

This invention relates generally to asymmetric digital subscriber loop (ADSL) transceivers and more particularly to discrete multi-tone (DMT) asymmetric digital subscriber loop (ADSL) transceivers.

As is known in the art, ADSL modems achieve full-duplex operation over a single pair of subscriber loop (i.e., twisted pair telephone line) through the use of either frequency-division-multiplexing (FDM) or echo cancellation (EC). ADSL modems use DMT, a multi-carrier modulation technique, to achieve high bandwidth efficiency over a bandwidth of about 1.024 MHz (more precisely, 1.104 MHz). An ADSL transceiver system generally includes a modem at a central station, or office, adapted to transmit information in a down-stream signal to a modem at a remote terminal and to receive information in an up-stream signal transmitted by the modem at the remote terminal. The up-stream and down-stream signals pass through a common transmission medium, typically the twisted-pair telephone line. The up-stream signal comprises data carried by a lower portion of a band of frequencies extending over M, here 255, subchannels; i.e., the lower 31 subchannels. The down-stream signal comprises data carried by an upper portion of the 255 subchannels; i.e., the upper subchannels from subchannel 1 through 255). (The generation of these M subchannels may be with an N point Fast Fourier Transform (F.F.T.), where the N point F.F.T. provides M=(N/2)−1 subchannels; i.e., here N=512). Thus, this frequency band asymmetry is intended to accommodate a large down-stream signal data rate to support data-hungry applications such as video-on-demand and Internet access, and a low up-stream signal data rate for interactive control and basic-rate IDSN. This is implemented by employing an eight times wider bandwidth for the down-stream signal than for the up-stream signal. In terms of the multi-carrier modulation, the down-stream signal bandwidth consists of carrier subchannels 1 through 255 whereas the up-stream signal bandwidth consists of only carrier subchannels 1 through 31; in actual practice the first 6 to 8 carrier subchannels are used as a guard-band for plain ordinary telephone service (POTS). An EC based system makes use of the carrier allocation just mentioned, however, FDM systems avoid the overlap of up-stream and down-stream signal bandwidths by using a carrier assignment such as subchannels 35 through 255 for the down-stream subchannels and 8 through 31 for the up-stream subchannels, for example.

One such DMT FDM ADSL system 10, shown in FIG. 1, is adapted to exchange information between a modem 12 at a first station, here a central office (CO), and a modem 14 at a second station, here a remote terminal (RT), through a common communication medium 16, here a twisted-pair telephone line. The system 10 includes: a transmitter section 18, at the central office modem 12, for distributing a first stream of data on line 13 among a plurality of, M, (here 255) carrier frequencies shown in FIG. 2. More particularly, the transmitter section 18 of the central office modem 12 includes a modulator 20, here for receiving frames of the data on line 13 and for distributing such data over the upper portion of the plurality of, M, carrier frequencies. Here, the modulator 20 includes a Quadrature Amplitude Modulator (Q.A.M.) encoder 24 and an Inverse Fast Fourier Transformer (I.F.F.T.) 26 arranged in as conventional manner as shown. Here, the I.F.F.T. 26 is a 512 point I.F.F.T. Thus, the incoming data on line 13 is selectively encoded by the Q.A.M. encoder 24 at a frame rate, $f_r$, here about 4 KHz (more precisely 4.0588 KHz) and the I.F.F.T. 26 produces for each frame a sequence of digital samples on line 22 at a rate $f_s=2(M+1)f_r$. More particularly, the sequence of digital samples on line 13 is encoded by Q.A.M. encoder 24 onto the 256 input lines $28_0$–$28_{511}$ of the I.F.F.T. 26 as a sequence of frames, here at a frame rate of 4 KHz. Thus, for each frame of data fed to lines $28_0$–$28_{511}$ a sequence of digital samples is produced by the I.F.F.T. 26 on line 22 at a sampling rate of about $f_s=2.048$ MHz (more precisely 2.208 MHz).

The transmitter section 18 of the central office modem 12 also includes: a digital to analog converter (DAC) 30 for converting the sequence of samples of digital samples into a corresponding analog signal on line 32 at the rate $f_s=2.048$ MHz; and a band pass filter 34, fed by the analog signal and having a pass band extending over the upper portion of the M carrier frequencies, for producing, after passing through a conventional isolation hybrid 36, on the common communication medium 16, the down-stream signal having a band width extending over the upper portion of the M carrier frequencies; here over subchannels 35 through 255 as shown in FIG. 2.

The remote terminal modem 14 includes a receiver section 40 having: a band pass filter 42, coupled to the common communication medium 16 via a hybrid 43, for passing signals in the down-stream signal fed thereto by the central office modem 12 transmitter section 18. As noted above, the data in the down-stream signal extends over the upper portion of the M carrier frequencies (i.e., subchannels 35 through 255, FIG. 2). An analog to digital converter (ADC) 44 is provided for converting the signals passed by the band pass filter 42 into a sequence of digital data on bus 46. The data on bus 46 is produced at the sampling rate, $f_s$. A demodulator 48 is fed by the sequence of data samples produced by the analog to digital converter 44 on bus 46, for separating such digital data in such samples on bus 46 into the upper portion of the plurality of M carrier frequencies (i.e., into subchannels 1 through 255, FIG. 2, it being understood that only the data in subchannels 35 through 255 are of interest). More particularly, the demodulator 48 includes a Time Domain Equalizer (T.D.Q.)/512 point Fast Fourier Transformer (F.F.T.) 50 and a Q.A.M. decoder 52, arranged in a conventional manner as shown to provide, ideally, a stream of data on line 54 corresponding to the stream of data line 13.

The remote terminal modem 14 includes a transmitter section 60, for distributing a second stream of data fed to the remote terminal modem 14 on line 63 among the lower portion of the plurality, M, 4 KHz wide, carrier frequencies shown in FIG. 2 (i.e., on channels 8 through 31). More particularly, the transmitter section 60 includes a modulator 62, here for receiving the data on line 63 and for distributing such data over subchannels 8 through 31. Here, the modulator 62 includes a Quadrature Amplitude Modulator (Q.A.M.) encoder 64 and an Inverse Fast Fourier Transformer (I.F.F.T.) 66 arranged in as conventional manner as shown. Here, the I.F.F.T. 66 is a 64 point I.F.F.T. Thus, the incoming data on line 63 is selectively encoded by the Q.A.M. encoder 64 at the frame rate, $f_r$, here 4 KHz and the I.F.F.T. 66 produces for each frame a sequence of digital samples on line 63 at a rate $f_s/8=2(M+1)f_r/8$. More particularly, the sequence of digital samples on line 63 is encoded by Q.A.M. encoder 64 onto the 64 input lines $68_0$–$68_{63}$ of the I.F.F.T. 66 as a sequence of frames, here at a frame rate of 4 KHz. Thus, for each frame of data fed to lines $68_0$–$28_{63}$, a sequence of digital samples is produced by the I.F.F.T. 66 on bus 70 at a rate of $f_s/8=256$ KHz.

The transmitter section 60 of the remote terminal modem 14 also includes: a digital to analog converter (DAC) 72 for converting the sequence of samples of digital samples on bus 70 into a corresponding analog signal on line 74. A lowpass filter 76 is fed by the analog signal and has a bandwidth extending over the lower portion of the M carrier frequencies (i.e., from dc to 128 KHz (i.e., subchannel 31)), for producing, after passing through a conventional isolation hybrid 43, on the common communication medium 16, the up-stream signal having a band width extending over such lower portion of the M carrier frequencies; here over subchannels 8 through 31 as shown in FIG. 2.

The central office modem 12 includes a receiver section 80 having: a lowpass filter 82, coupled, via the isolation hybrid 36, to the common communication medium 16, for passing signals in the up-stream signal fed thereto by the remote terminal modem 14 extending over lower portion of the M carrier frequencies, here over subchannels 8 through 31. An analog to digital converter 84 is provided for converting the signal passed by the lowpass filter 82 into a sequence of digital data on bus 86 at the sampling rate, $f_s/8$. A demodulator 88 is fed by the sequence of samples produced by the analog to digital converter 84 on bus 86 for combining the digital data in such samples into the lower portion of the M carrier frequencies (i.e., the data in subchannels 8 through 31) into a data stream on line 90 corresponding, ideally, to the data stream on line 63. Here, the demodulator 88 includes a Time Domain Equalizer (T.D.Q.)/64 point Fast Fourier Transformer (F.F.T.) 92 and a Q.A.M. decoder 94. Thus, T.D.Q./F.F.T. 92 separates the digital data fed thereto by the analog to digital converter 84 at rate $f_s/8$, into frames of data at the 4 KHz frame rate among subchannels 1 through 31 (on lines $95_0$–$95_{63}$, respectively); it being understood that the data of interest will appear in subchannels 8 through 31. The data on lines $94_5$–$94_{31}$ are combined by the Q.A.M. encoder 94 to produce a properly arranged stream of data on line 90.

It should be noted that because the transform size used for the up-stream signal (i.e., a 64 point I.F.F.T. 66) is different from the transform size used for the down-stream signal (i.e., a 512 point I.F.F.T. 26), the down-stream signal bandwidth of 255 subchannels extends to $f_s/2$ and the up-stream signal bandwidth of subchannels 8–31 extends to nearly $f_s/16$. Thus, considering first the up-stream signal produced by the remote terminal modem 14, it is first noted that the up-stream signal has a bandwidth from subchannel 8 through 31, i.e., a frequency spectrum shown in FIG. 3). However, the data produced on bus 70 by modulator 62 also includes images (i.e., aliases) which repeat at the rate that data is produced on bus 70. Here, as noted above, digital samples are produced on bus 70 at $f_s/8$; a rate greater than twice the highest frequency in the up-stream signal bandwidth. Thus, while the images of the up-stream signal (i.e., subchannels 8 through 31) repeat at the frequency $f_s/8$, as shown by the shaded spectrum 71 in FIG. 3 and therefore do not alias unto itself, it is noted that such images $71_{images}$ extend into the bandwidth of the down-stream signal, i.e., into subchannels 35 through 255, as shown in FIG. 3. The sinx/x, where x is frequency, filter effect of the DAC 72 is shown by the dotted line in FIG. 4A. These un-wanted images $71_{images}$ are filtered to some extent by the up-stream transmit low-pass filter 76 and the hold effect of the DAC 72, but they are not removed altogether. The amount of filtering is limited since the use of high-order analog filters for filter 76, in addition to being expensive, also have long impulse responses that introduce excessive intersymbol interference and degrade modem performance. The remaining images pass through the hybrid 43 with some limited attenuation, and appear, as noted above, directly within the band (i.e., channels 35 through 255) occupied by the down-stream signal thereby causing interference. Referring also to FIG. 4B, the frequency spectrum 73 of the down-stream signal is shown as a function of frequency. The images of the up-stream signal are shown shaded in FIG. 4B. It is noted that the attenuation in the down-stream signal increases at higher signal frequencies so that the echo signal from the DAC 72 images can exceed the level of the received down-stream signal. As a result, severe degradation of the down-stream signal to noise ratio (SNR) may result.

A similar problem occurs at the central office modem 18. At the central office modem, the ADC 84 sampling rate, $f_s/8$, is one-eighth that of the sampling rate, $f_s$, of the down-stream signal. That is, samples are produced by ADC 84 on bus 86 at a rate, $f_s/8$, and samples are produced by the I.F.F.T. 26 at the rate $f_s$. The frequency spectrum of the down-stream signal is shown in FIG. 5A. The frequency spectrum of subchannels 5 through 31 is shown in the shaded region 77 in FIG. 5A. The spectrum of two images of such spectrum at the output of ADC 84 are shown in FIGS. 5B and 5C. Thus, while the up-stream signal is sampled at twice the highest frequency in the bandwidth covering channels 8 through 31 (i.e., the up-stream signal is sampled at twice $f_s/16$) so that images thereof will not alias onto themselves, it is noted the unwanted portion of the down-stream signal passing into the receiver section of the central office receiver section 80 are sampled at a rate $f_s/8$; i.e., a rate one-eighth the Nyquist sampling rate required to prevent aliasing of the down-stream signal. Thus, with the up-stream sampling rate, $f_s/8$, of the ADC 84 the images of the down-stream signal occupy the frequency spectrum of subchannels 8 through 31, i.e., the frequencies of the up-stream signal. Clearly, with limited hybrid 36 attenuation, the down-stream signal will be aliased by the ADC 84 and will fall directly within subchannels 8–31 causing interference with the up-stream signal.

SUMMARY OF THE INVENTION

In accordance with the present invention, a method of operating a discrete multi-tone, asymmetrical modem system is provided wherein a modem at a central office transmits information to a modem at a remote terminal on a down-stream signal and the modem at the remote terminal transmits information to the modem at the central office on an up-stream signal. The up-stream and down-stream signals pass through a common transmission medium. The up-stream signal comprises data carried by a lower portion of a predetermined band of frequencies and the down-stream signal comprises data carried by an upper portion of the predetermined band of frequencies. The method includes the step of oversampling the up-stream signal. More particularly, the up-stream signal is sampled at a rate greater than twice the highest frequency in the band of frequencies carrying data to be transmitted to the central office. With such method, interference between the up-stream and down-stream signals arising from imaging and aliasing effects are reduced through the use of oversampling in the up-stream signal. That is, the up-stream signal is sampled at a rate greater than twice the highest frequency in the band of frequencies carrying data to be transmitted to the central office.

In accordance with another feature of the invention a discrete multi-tone, asymmetrical modem system is provided wherein a modem at a central office transmits information to a modem at a remote terminal on a down-stream signal and the modem at the remote terminal transmits information to the modem at the central office on an up-stream signal. The up-stream and down-stream signals pass through a common transmission medium. The up-stream signal comprises data carried by a lower portion of a predetermined band of frequencies and the down-stream signal comprises data carried by an upper portion of the predetermined band of frequencies. Interference between the up-stream and down-stream signals arising from imaging and aliasing effects are reduced through the use of oversampling in the up-stream signal. That is, the up-stream signal is sampled at a rate greater than twice the highest frequency in the band of frequencies carrying data to be transmitted to the central office.

In a preferred embodiment, interpolation and oversampled digital to analog conversion are used to in the remote terminal modem up-stream transmitter to provide the oversampling. The interpolator is provided at the remote terminal, for adding interpolated data into a stream of data distributed by the remote terminal modem among the lower portion of the predetermined band of frequencies for transmission in the up-stream signal. With such arrangement, the interpolator increases the rate samples of the data that are produced on the up-stream signal and thereby increases the frequency of the up-stream signal images for more effective removal by the low pass filter of the remote terminal. Thus, the low pass filter reduces interference from the up-stream signal into the down-stream signal being processed by the remote terminal.

In accordance with another feature of the invention, oversampled analog to digital conversion and decimation are provided at the central office modem receiver. In a preferred embodiment, an analog to digital converter is provided at the modem of the central office, for converting the down-stream signal into digital samples at a sampling rate greater than the frequency of the twice the highest frequency in the band of frequencies carrying the up-stream signal. A decimator is provided. The decimator is fed samples from the analog to digital converter at the analog to digital sampling rate and produces output samples at a lower sampling rate. A demodulator is fed the samples produced by the decimator at the lower sampling rate and converts such samples into the lower portion of the predetermined band of frequencies. With such an arrangement, by producing the digital samples at a rate greater than the highest frequency in the down-stream signal, images in the down-stream signal which may couple into the receiver at the central office from its transmitter are increased in frequency and then are effectively filtered by the decimator to thereby increase the isolation to the down-stream signal from the central office receiver.

BRIEF DESCRIPTION OF THE DRAWING

Other features of the invention, as well as the invention itself will become more readily apparent with reference to the following detailed description taken together with the following drawings, in which:

FIG. 4A is a frequency spectrum of the up-stream signal and images thereof and the filtering effect of a digital to analog converter used in a transmitter section of a remote terminal mode used in the PRIOR ART system of FIG. 1;

FIG. 4B is a frequency spectrum of the down-stream signal with images of the up-steam signal produced by the PRIOR ART system of FIG. 1 being shown superimposed thereon;

DESCRIPTION OF THE PREFERRED EMBODIMENTS

Figure 6:
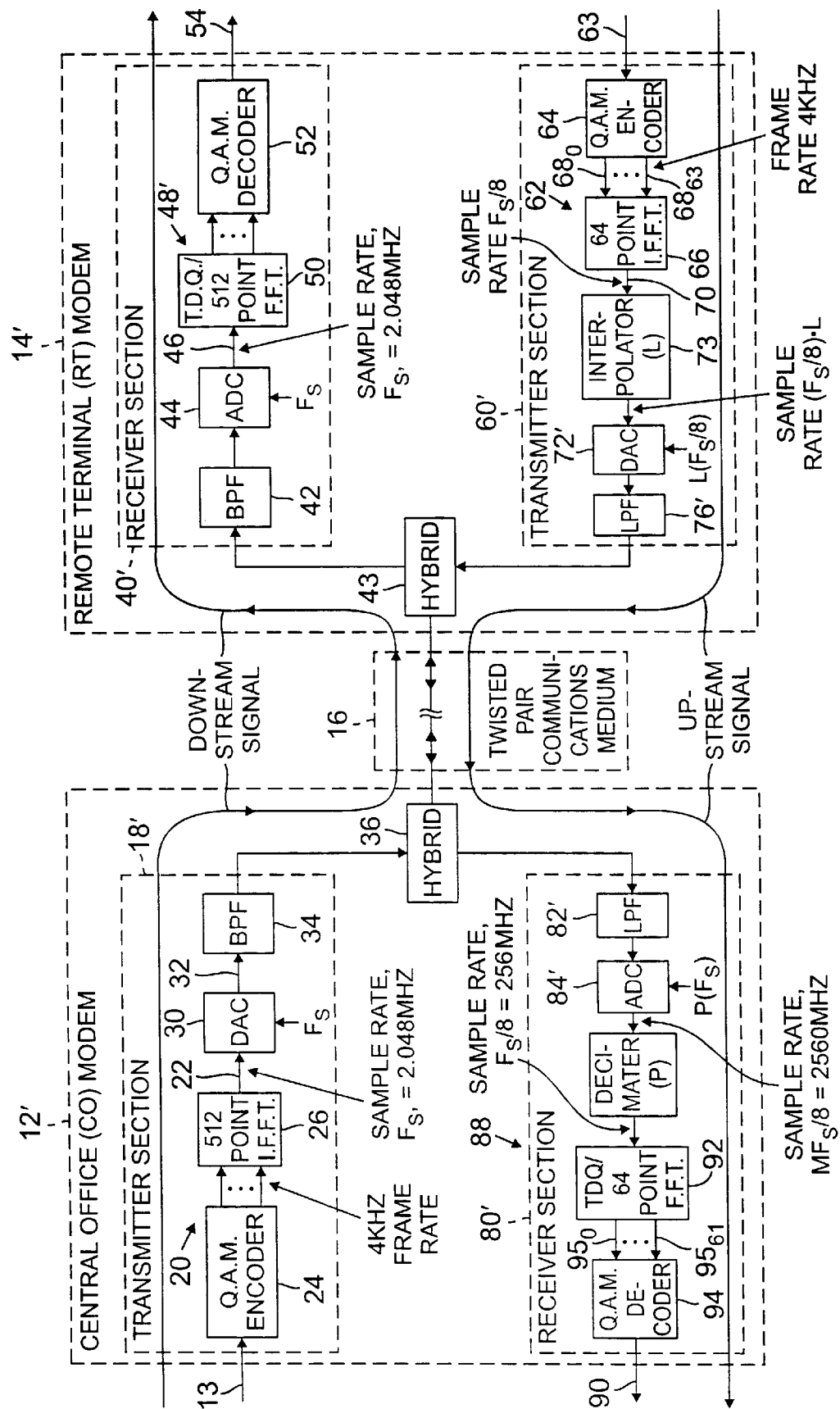
FIG. 6 is a block diagram of a DMT ADSL system according to the invention.

Referring now to FIG. 6, a DMT ADSL system 10' is shown. System 10', like system 10 (FIG. 1), is adapted to exchange information between a modem 12' at a first station, here a central office (CO), and a modem 14' at a second station, here a remote terminal (RT), through a common communication medium, here a twisted-pair telephone line 16. The system includes: a transmitter section, at the first station, for distributing a first stream of data among a plurality of, M, (here 255) carrier frequencies shown in FIG. 2. Thus, like system 10 in FIG. 1, a transmitter section 18', at the central office modem 12', for distributing a first stream of data on line 13 among a plurality of, M, (here 255) carrier frequencies shown in FIG. 2. More particularly, the transmitter section 18' of the central office modem 12' includes a modulator 20, here for receiving frames of the data on line 13 and for distributing such data over the upper portion of the plurality of, M, carrier frequencies. Here, the modulator 20 includes a Quadrature Amplitude Modulator (Q.A.M.) encoder 24 and an Inverse Fast Fourier Transformer (I.F.F.T.) 26 arranged in as conventional manner as shown. Here, the I.F.F.T. 26 is a 512 point I.F.F.T. Thus, the incoming data on line 13 is selectively encoded by the Q.A.M. encoder 24 at a frame rate, $f_r$, here 4 KHz and the I.F.F.T. 26 produces for each frame a sequence of digital samples on line 22 at a rate $f_s=2(M+1)f_r$, as described above in connection with FIG. 1.

Figure 1:
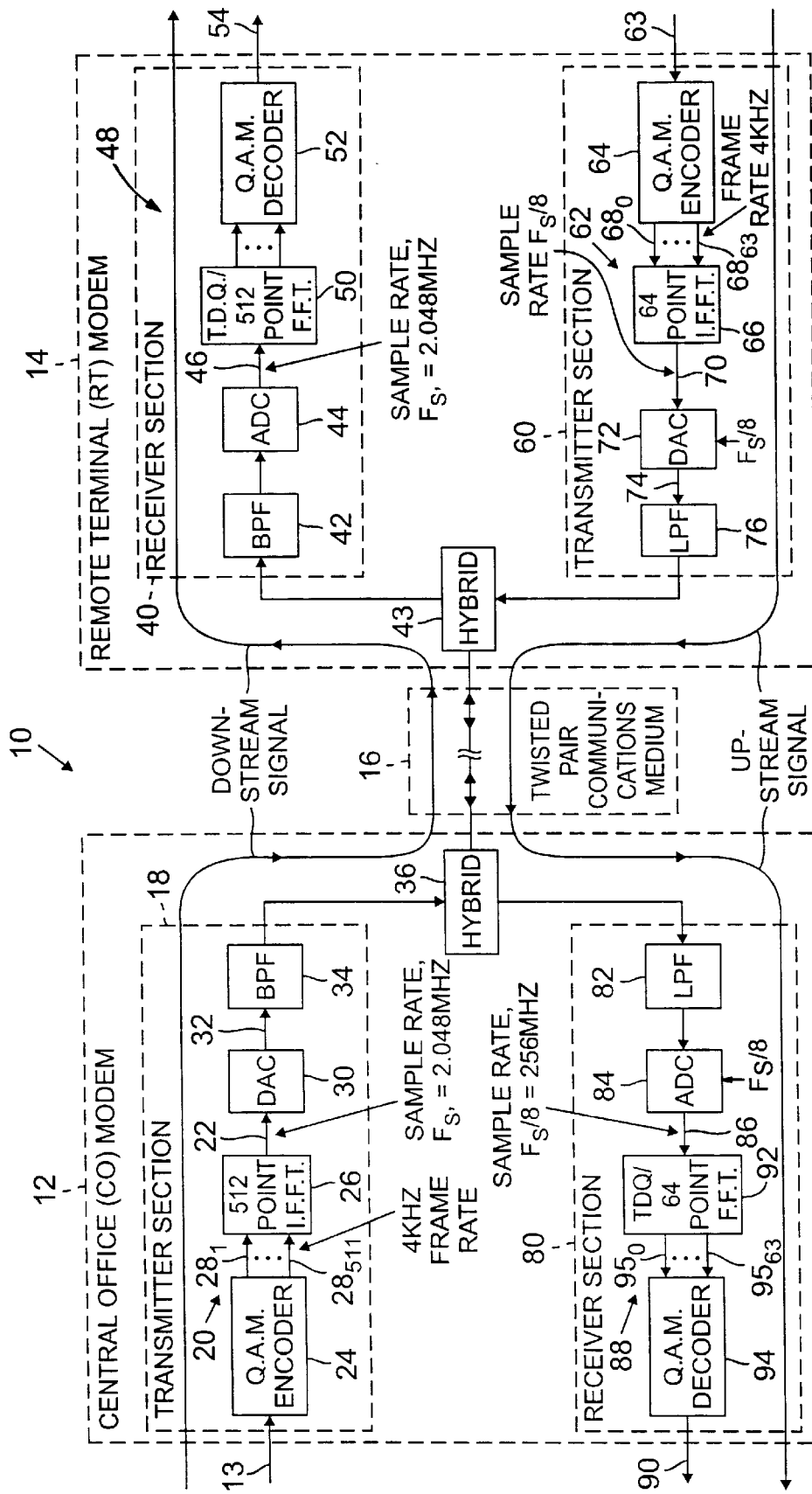
FIG. 1 is a block diagram of a DMT ADSL system according to the PRIOR ART.
Figures 2, 3:
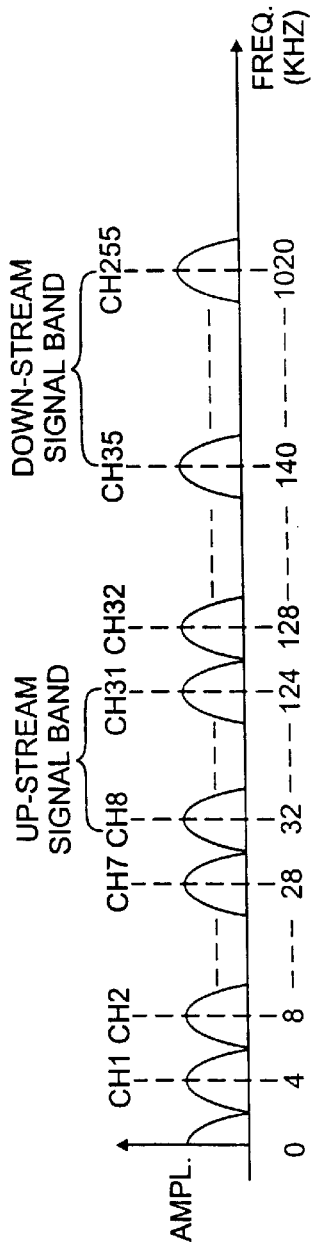
FIG. 2 is a frequency spectrum of signals produced by the system of FIG. 1.
FIG. 3 is a frequency spectrum of the up-stream signal and images thereof.
Figures 5A, 5B, 5C:
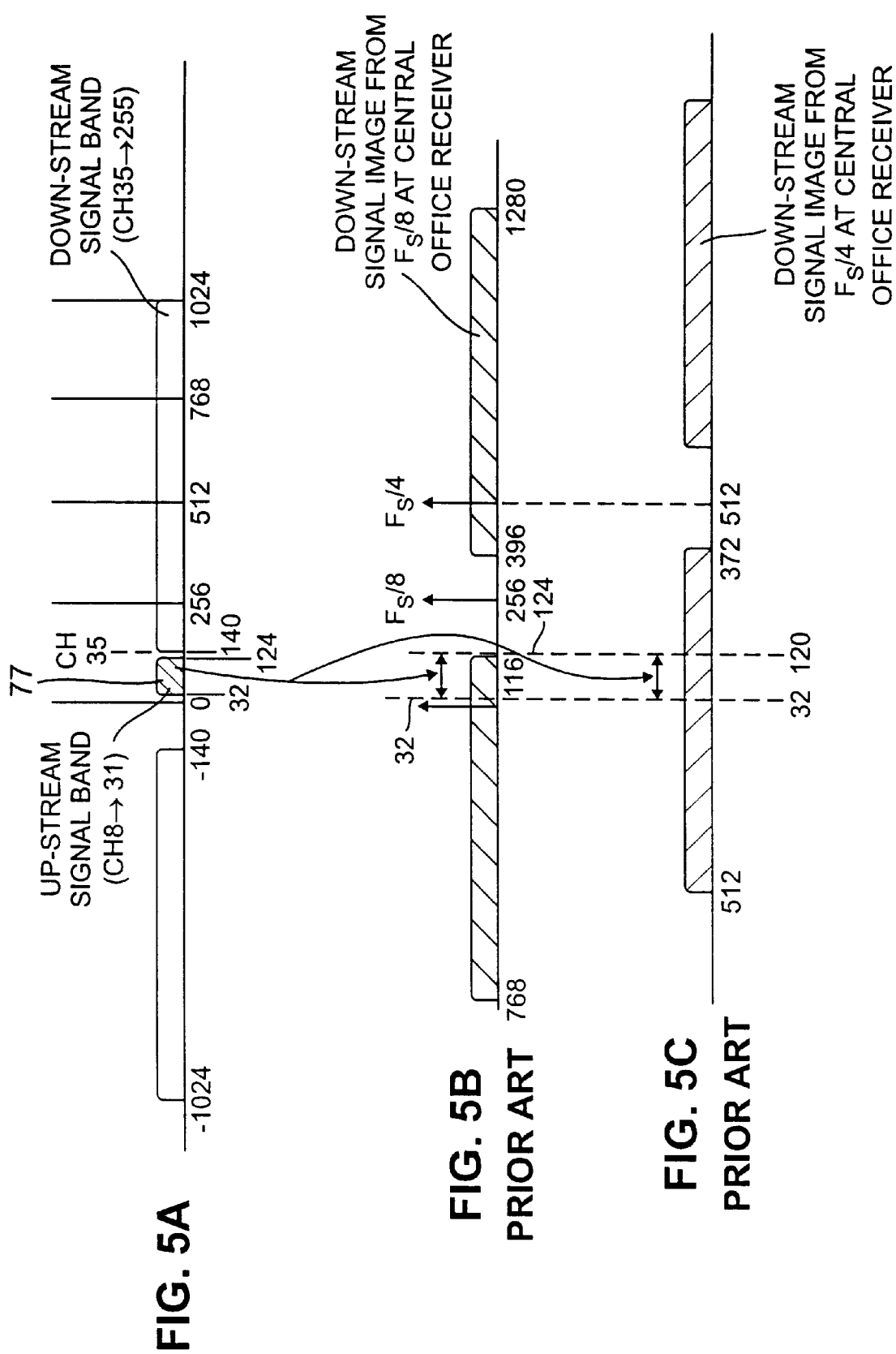
FIG. 5A is a frequency spectrum of the up-stream signal with images of the bandwidth of the down-steam signal being shown superimposed thereon.
FIGS. 5B and 5C are frequency spectrum of images of the down-stream signal by the up-stream receiver produced by the PRIOR ART system of FIG. 1.

The transmitter section 18' of the central office modem 12' also includes: a digital to analog converter 30 for converting the sequence of samples of digital samples into a corresponding analog signal on line 32 at a rate $f_s$; and a band pass filter 34, fed by the analog signal and having a pass band extending over the upper portion of the M carrier frequencies, for producing, after passing through a conventional isolation hybrid 36, on the common communication medium 16, the down-stream signal having a band width extending over the upper portion of the M carrier frequencies; here over subchannels 35 through 255 as shown in FIG. 2 and as described above in connection with FIG. 1.

The remote terminal modem 14' includes a receiver section 40' having: a band pass filter 42, coupled to the common communication medium 16 via a hybrid 43, for passing signals in the down-stream signal fed there by the central office modem 12 transmitter section 18. As noted above, the data in the down-stream signal extends over the upper portion of the M carrier frequencies (i.e., subchannels 35 through 255, FIG. 2). An analog to digital converter 44 is provided for converting the signals passed by the band pass filter 42 into a sequence of digital data on bus 46. The data on bus 46 is produced at the sampling rate, $f_s$. A demodulator 48 is fed by the sequence of data samples produced by the analog to digital converter 44 on bus 46, for separating such digital data in such samples on bus 46 into the upper portion of the plurality of M carrier frequencies (i.e., into subchannels 1 through 255, FIG. 2, it being understood that only the data in subchannels 8 through 255 are of interest). More particularly, the demodulator 48' includes a Time Domain Equalizer (T.D.Q.)/512 point Fast Fourier Transformer (F.F.T.) 50 and a Q.A.M. decoder 52, arranged in a conventional manner as shown to provide a stream of data on line 54 corresponding to the stream of data line 13.

The remote terminal modem 14' includes a transmitter section 60', for distributing a second stream of data fed to the remote terminal modem 14' on line 63 among the lower portion of the plurality, M, 4 KHz wide, carrier frequencies shown in FIG. 2. More particularly, the transmitter section 60' includes a modulator 62', here for receiving the data on line 63 and for distributing such data over subchannels 8 through 31. Here, the modulator 62 includes a Quadrature Amplitude Modulator (Q.A.M.) encoder 64 and an Inverse Fast Fourier Transformer (I.F.F.T.) 66 arranged in as conventional manner as shown. Here, the I.F.F.T. 66 is a 64 point I.F.F.T. Thus, the incoming data on line 63 is selectively encoded by the Q.A.M. encoder 64 at the frame rate, $f_r$, here 4 KHz and the I.F.F.T. 66 produces for each frame a sequence of digital samples on line 70 at a rate $f_s/8$. More particularly, the sequence of digital samples on line 63 is encoded by Q.A.M. encoder 64 onto the 32 input lines $68_0$–$68_{63}$ of the I.F.F.T. 66 as a sequence of frames, here at a frame rate of 4 KHz. Thus, for each frame of data fed to lines $68_0$–$68_{63}$, a sequence of digital samples is produced by the I.F.F.T. 66 on bus 70 at a rate of $f_s/8=256$ KHz.

Figure 7:
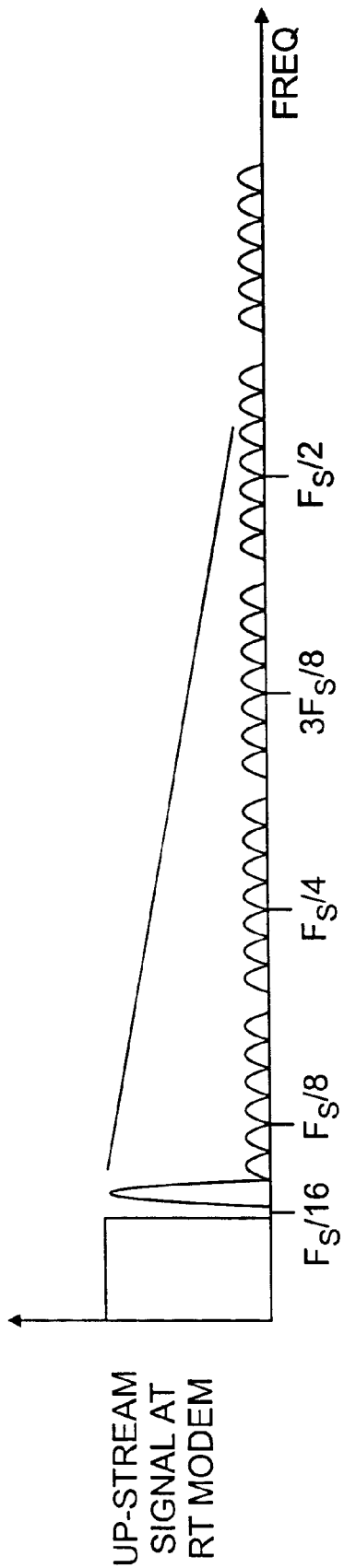
FIG. 7 is frequency response of the up-stream signal produced by the transmitter section at the remote terminal modem of the system of FIG. 6.

Here, however, unlike the system 10 of FIG. 1, a digital interpolator 73 is coupled to the output of the modulator 62 for adding interpolated data into a stream of data distributed by the remote terminal modem 14' to reduce the effect of aliasing by increasing the rate at which samples are produced by the modulator 62 from the $f_s$ sampling rate to a rate $L*(f_s/8)$ prior to passing to the DAC 72' and lowpass filter 76', as shown. More particularly, the interpolator adds interpolated digital samples between the digital samples to the samples being produced by the modulator 62 at the rate $f_s/8$. Thus, the digital samples are produced by the interpolator at the rate $Lf_s/8$, where L is an integer greater than, or equal to, 2. Thus, the oversampling ratio, L, (i.e., the ratio of the rate samples are produced by the interpolator 73 to the rate samples are being fed to the interpolator 73) of the interpolator 73 is an integer L equal to, or greater than, 2. This oversampling raises the sampling rate from $f_s/8$ to $Lf_s/8$ at the DAC 72' and enables digital suppression of the lower frequency images in the interpolator 73 so that the remaining images can be more easily, and effectively removed by the analog transmitter section 60' low pass filter 76'. FIG. 7 shows a typical output of the DAC 72' after interpolation by L=8 and illustrates the capability of attenuating the images by the filtering effect of the interpolator 73. The following TABLE shows the stopband frequencies for the lowpass filter 76' that are required for various choices of interpolation ratio, L, and indicates that the analog filter requirements for filter 76' progressively relax as L increases. The passband of the lowpass filter 76' is $f_s/16$, so that as the stopband frequency increases, the shape factor of the filter 72', (i.e., the ratio of the stopband frequency to the passband) increases.

TABLE

| Interpolation Ratio (L) | Lowpass Filter 72' Stopband Frequency | Lowpass Filter 72 Shape Factor |
| --- | --- | --- |
| 1 (no interpolation) | $f_s/16$ | 1 |
| 2 | $3f_s/16$ | 3 |
| 3 | $5f_s/16$ | 5 |
| 4 | $7f_s/16$ | 7 |
| L | $(2L-1)f_s/16$ | 2L-1 |

The central office modem 12' includes a receiver section 80' having: a lowpass filter 82', with a bandwidth and stop band, here, the same as lowpass filter 72', described above. The output of the lowpass filter 82' is fed to ADC 84'. ADC 84' here produces digital samples at a rate $Pf_s/8$, where P is the decimation ratio, i.e., the ratio of the rate data is fed to the decimator 85 to the rate data is produced by the decimator 85; where P is an integer equal to or greater than 2. The digital samples produced by the ADC 84' at the rate $Pf_s/8$ are decimated by a factor of P by digital decimator 85. Thus, digital samples are produced by the decimator 85 at a rate ($f_s/8$). The oversampling by the analog to digital converter 84, reduces the amount of aliasing at the ADC 84' because the filtering provided by the decimator 85 attenuates signals in the bands above $f_s/16$ (i.e., subchannel 31) that are subject to aliasing when the compressed back down to a rate of $f_s/8$ by the decimator 85. The selectivity of the analog lowpass filter 82' is significantly reduced depending on the oversampling as described in the TABLE above, which applies to filter 82'. For the case where P=8, the frequency response of the decimator 85 would also resemble FIG. 7.

The demodulator 88 is fed by the sequence of samples produced by the decimator 85. The decimator 85 is fed samples from the ADC 84' at the ADC 85' sampling rate $P(f_s/8)$ and produces output samples at a lower sampling rate, $f_s/8$. The samples produced by the decimator 85 and fed to the demodulator 88 at the lower sampling rate, $f_s/8$, are converted into samples in the lower portion of the M carrier frequencies, (i.e., the data in subchannels 8 through 31) into a data stream on line 90 corresponding to the data stream on line 63. Here, the demodulator 88 includes the T.D.Q/64 point Fast Fourier Transformer (F.F.T.) 92 and Q.A.M. decoder 94. Thus, T.D.Q./F.F.T. 92 separates the digital data fed thereto by the decimator 85 at rate $f_s/8$, into frames of data at the 4 KHz frame rate among subchannels 1 through 31 (on lines $94_0$–$94_{63}$, respectively); it being understood that the data of interest will appear in subchannels 8 through 31. The data on lines $94_8$–$94_{31}$ are combined by the Q.A.M. encoder to produce a properly arranged stream of data on line 90.

Figure 8:
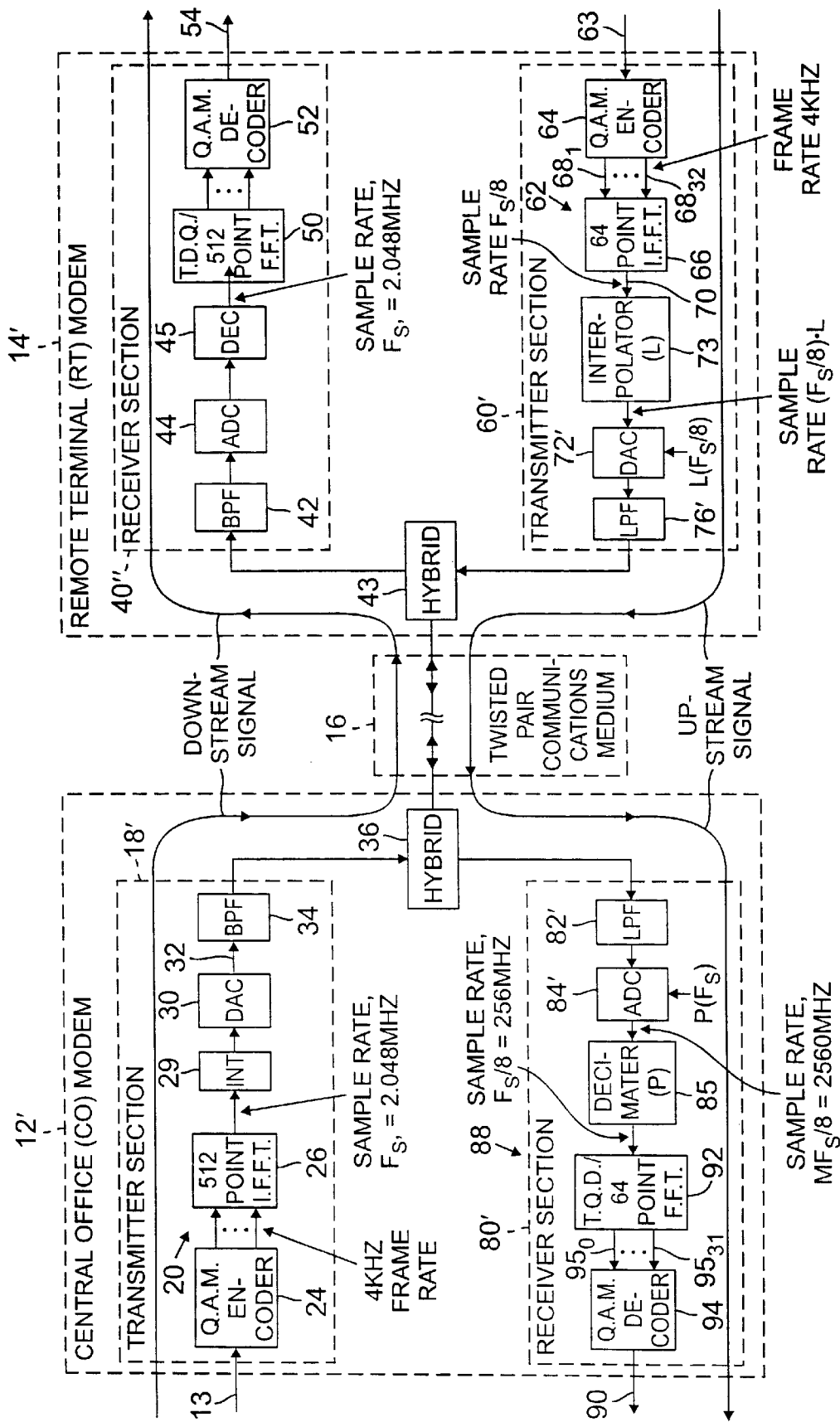
FIG. 8 is a block diagram of a DMT ADSL system according to the an alternative embodiment of the invention.

Other embodiments are within the spirit and scope of the appended claims. For example, other interpolation and decimation ratios L, P other than 8 may be used. This might be attractive, for example, to accommodate the use of oversampled sigma-delta ADCs or to simply allow oversampling of a conventional successive approximation register (SAR) or pipeline ADC to reduce quantization noise. Further, oversampling can be applied to the down-stream signal by use of an interpolator at the output of I.F.F.T. 26 and a decimator at the output of ADC 44 as well to reduce images of the down-stream signal. More particularly, because the DMT signal itself goes up to $f_s/2$, its images are difficult to filter with analog techniques. It is easier to oversample the transmitter section 18' using an interpolator 29 as shown in FIG. 8 (like elements having the same numerical designation) followed by a DAC 30 and bandpass filter 34. This allows the digital interpolator 29 to contend with the images and greatly reduces the requirements of the bandpass filter 34. Similarly, the remote terminal modem 14" can benefit by having an oversampled ADC 44 followed by a decimator 45, as shown in FIG. 8. This also reduces the requirement selectivity of the analog bandpass filter 42. In addition to simplifying analog filtering, the oversampling here also lowers the quantization noise of the DAC 30 and ADC 44 and could allow the use of sigma-delta converters. Also, the oversampling can facilitate the use of dynamic element matching techniques that improve the linearity of untrimmed DACs and ADCs. Still further, with the invention, digital filtering may be used instead of analog filtering. Typically the filters in the interpolators and decimators ate finite impulse response (FIR) and hence have linear phase if they have symmetric coefficients. For modem linear phase is desirable since it is easier to equalize. Also, digital filters have more exact specifications that are invariant in manufacture due to component variations as with analog filters. Further, although the system described herein above is a frequency division multiplex ADSL modem, the invention is also applicable to an echo-cancelling ADSL model configuration. In such configuration, the advantage of image and alias attenuation are provided.

What is claimed is:

1. An asymmetric digital subscriber loop system, comprising:
   (a) a central office, comprising:
      a transmitter section for transmitting information to a remote terminal in a down-stream signal, such down-stream signal having a plurality of subchannels extending over an upper portion of a predetermined band of frequencies; and,
      a receiver section for receiving information from the remote terminal in an up-stream signal, such up-stream signal having a plurality of subchannels extending over a lower portion of the predetermined band of frequencies, such up-stream signal and down-stream signal passing through a communication medium;
   (b) the remote terminal, comprising:
      a transmitter section for transmitting information to the central office in the up-stream signal; and,
      a receiver section for receiving information from the transmitter section in the down-stream signal; and
   (c) wherein the transmitter section of the remote terminal includes:
      a modulator for distributing a sequence of digital data among the lower portion of the plurality of subchannels, such modulator producing a sequence of digital data at a data rate greater than, or equal to, twice the highest frequency in the lower portion of the predetermined band of frequencies, such modulator producing undesired images of the lower portion of the plurality of subchannels falling into the upper portion of the plurality of subchannels, such undesired images being noise in the upper portion of the plurality of subchannels;
      an interpolator for inserting interpolated digital data into the sequence of digital data produced by the modulator to produce a sequence of digital data at a rate greater than the rate of the digital data produced by the modulator, such interpolator reducing said undesired images of the lower portion of the plurality of subchannels falling in the upper portion of the plurality of subchannels produced by the modulator, such interpolator reducing said noise within the upper portion of the plurality of subchannels;
      a digital to analog converter for converting the sequence of digital data produced by the interpolator having the reduced noise within the upper portion of the plurality of subchannels into the up-stream signal.

2. The system recited in claim 1 wherein the receiver section of the central office includes:
   an analog to digital converter for converting the up-stream signal into a sequence of digital data, such sequence of digital data being produced at a sampling rate greater than twice the highest frequency of the lower portion of the predetermined band of frequencies;
   a decimator, fed by the samples produced by the analog to digital converter at the sampling rate thereof, for producing output samples at a lower sampling rate; and
   a demodulator for converting the samples produced by the decimator at the lower sampling rate into a sequence of digital data.

3. A system for exchanging information between a first station and a second station through a communication medium, such system comprising:
   (a) a transmitter section, at the first station, for distributing a first stream of data among a plurality of, M, carrier frequencies, such transmitter section comprising:
      (i) a modulator for receiving frames of the data at a frame rate, $f_r$, and for producing for each frame a sequence of digital samples at a rate $f_s=[2(M+1)f_r]$, such sequence of digital samples comprising the first stream of data distributed over the plurality of, M, carrier frequencies;
      (ii) a digital to analog converter for converting the sequence of samples of digital samples into a corresponding analog signal; and,
      (iii) a band pass filter, fed by the analog signal and having a pass band extending over a predetermined, upper portion of the M carrier frequencies, for producing, on the communication medium, a down-stream signal having a band width extending over such upper portion of the M carrier frequencies;
   (b) a transmitter section, at the second station, for distributing a second stream of data among a lower portion of the M carrier frequencies, such transmitter section comprising:
      (i) a modulator for receiving frames of the data at the frame rate, $f_r$, and for producing for each frame a sequence of digital samples at a modulation output rate, such sequence of digital samples comprising the second stream of data distributed over a lower portion of the M carrier frequencies, such modulator producing undesired images of the lower portion of the plurality of subchannels falling into the upper portion of the plurality of subchannels, such undesired images being noise in the upper portion of the plurality of subchannels;
      (ii) an interpolator for inserting interpolated digital data into the sequence of digital samples produced by the modulator to produce a sequence of digital data at a rate greater than the modulation output rate, such interpolator reducing said undesired images of the lower portion of the plurality of subchannels falling in the upper portion of the plurality of subchannels produced by the modulator, such interpolator reducing said noise within the upper portion of the plurality of subchannels;
      (iii) a digital to analog converter for converting the sequence of samples of digital samples produced by the interpolator having the reduced noise within the upper portion of the plurality of subchannels into a corresponding analog signal; and (iv) a filter, fed by the analog signal and having a pass band extending over the predetermined, lower portion of the M carrier frequencies, for producing an up-stream signal on the communication medium having a bandwidth extending over such lower portion of the M carrier frequencies;

(c) a receiver section, at the second section, comprising:
 (i) a band pass filter, coupled to the communication medium, for passing signals in the down-stream signal fed by the first station extending over the predetermined, upper portion of the M carrier frequencies;
 (ii) an analog to digital converter for converting the signal passed by the band pass filter of the receiver section into a sequence of digital data at the sampling rate, $f_s$; and,
 (iii) a demodulator, fed by the sequence of samples produced by the analog to digital converter for separating digital data in such samples into a sequence of digital data.

4. The system recited in claim 3 wherein the first station includes a receiver section, comprising:
 (i) a filter, coupled to the communication medium, for passing signals in the up-stream signal fed thereto by the second station extending over the predetermined, lower portion of the M carrier frequencies;
 (ii) an analog to digital converter for converting the signal passed by the band pass filter of the receiver section into a sequence of digital data at the sampling rate, $f_s$;
 (iii) a decimator, fed by the samples produced by the analog to digital converter at the sampling rate thereof, for producing output samples at a lower sampling rate; and
 (iv) a demodulator for converting the samples produced by the decimator at the lower sampling rate into a sequence of digital data.

5. An asymmetric digital subscriber loop system, comprising:
 (a) a first modem, comprising:
  a transmitter section for transmitting information in an out-going signal to a second modem, such out-going signal having a first plurality of subchannels extending over a first portion of a predetermined band of frequencies; and,
  a receiver section for receiving information in an incoming signal, such incoming signal having a second plurality of subchannels extending over a second portion of the predetermined band of frequencies, such out-going and incoming signals passing through a communication medium;
 (b) the second modem, comprising:
  a transmitter section for transmitting information to the first modem in the incoming signal; and,
  a receiver section for receiving information from the transmitter section in the out-going signal; and
 (c) wherein the transmitter section of the second modem includes:
  a modulator for distributing a sequence of digital data among the second portion of the plurality of subchannels, such modulator producing undesired images of the lower portion of the plurality of subchannels falling into the upper portion of the plurality of subchannels, such undesired images being noise in the upper portion of the plurality of subchannels;
  an interpolator for inserting interpolated digital data into the sequence of digital data produced by the modulator to produce a sequence of digital data at a rate greater than the rate of the digital data produced by the modulator, such interpolator reducing said undesired images of the lower portion of the plurality of subchannels falling in the upper portion of the plurality of subchannels produced by the modulator, such interpolator reducing said noise within the upper portion of the plurality of subchannels;
  a digital to analog converter for converting the sequence of digital data produced by the interpolator having the reduced noise within the upper portion of the plurality of subchannels into the up-stream signal.

6. The system recited in claim 5 wherein the receiver section of the first modem includes:
 an analog to digital converter for converting the incoming signal into a sequence of digital data, such sequence of digital data being produced at a sampling rate greater than twice the highest frequency of the second portion of the predetermined band of frequencies;
 a decimator, fed by the samples produced by the analog to digital converter at a first sampling rate, for producing output samples at a second sampling rate, the second sampling rate being less than the first sampling rate; and
 a demodulator for converting the samples produced by the decimator at the second sampling rate into a sequence of digital data.

7. A modem, comprising:
 a transmitter section for transmitting information in an out-going signal, such out-going signal having a first plurality of subchannels extending over a first portion of a predetermined band of frequencies; and,
 a receiver section for receiving information from an incoming signal, such incoming signal having a second plurality of subchannels extending over a second portion of a predetermined band of frequencies; and,
 such transmitter section comprising:
  a modulator for distributing a sequence of digital data among the first portion of the plurality of subchannels, such modulator producing undesired images of the lower portion of the plurality of subchannels falling into the upper portion of the plurality of subchannels, such undesired images being noise in the upper portion of the plurality of subchannels;
  an interpolator for inserting interpolated digital data into the sequence of digital data produced by the modulator to produce a sequence of digital data at a rate greater than the rate of the digital data produced by the modulator, such interpolator reducing said undesired images of the lower portion of the plurality of subchannels falling in the upper portion of the plurality of subchannels produced by the modulator, such interpolator reducing said noise within the upper portion of the plurality of subchannels;
  a digital to analog converter for converting the sequence of digital data produced by the interpolator having the reduced noise within the upper portion of the plurality of subchannels into the out-going signal.

* * * * *